C. W. MIEGEL.
TIRE CASING.
APPLICATION FILED SEPT. 9, 1919.

1,375,527. Patented Apr. 19, 1921.

WITNESSES

INVENTOR
C. W. MIEGEL,
BY
ATTORNEYS

UNITED STATES PATENT OFFICE.

CHARLES WILLIAM MIEGEL, OF JERSEY CITY, NEW JERSEY.

TIRE-CASING.

1,375,527.  Specification of Letters Patent.  Patented Apr. 19, 1921.

Application filed September 9, 1919. Serial No. 322,607.

*To all whom it may concern:*

Be it known that I, CHARLES W. MIEGEL, a citizen of the United States, and a resident of Jersey City, in the county of Hudson and State of New Jersey, have invented certain new and useful Improvements in Tire-Casings, of which the following is a specification.

My invention is an improvement in tire casings, and has for its object to provide a casing of the character specified, especially adapted to be proof against blow-outs, rim cuts, and side wall breaks, and to add resiliency to the tire.

In the drawings:—

Figure 1:
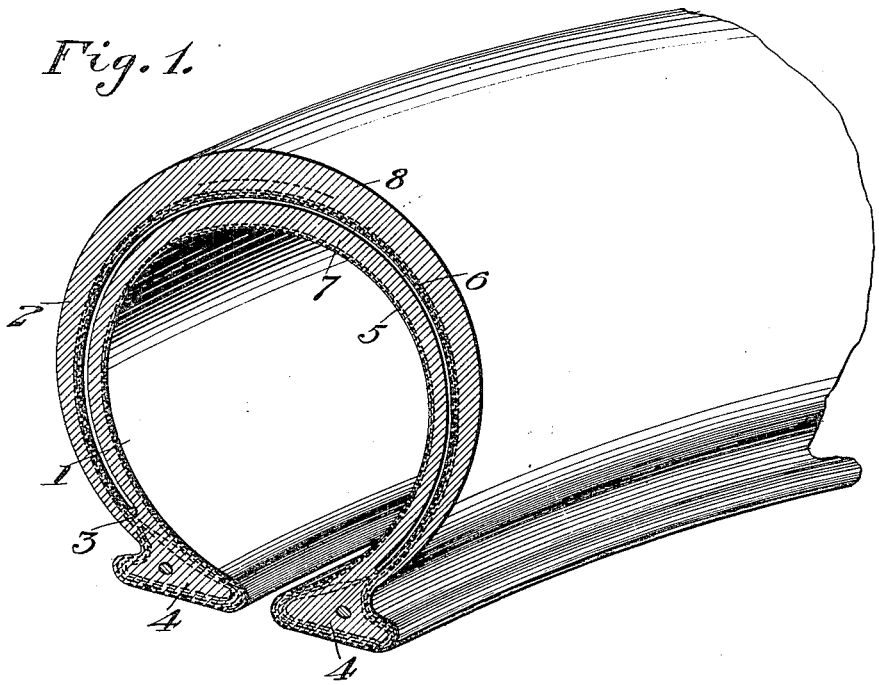
Figure 1 is a perspective view of a portion of the improved tire.
Figure 2:
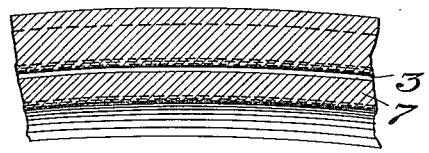
Fig. 2 is a fragmentary longitudinal section.

In the present embodiment of the invention, the improved tire consists of an inner layer 1 and an outer layer 2, which are integrally connected as indicated at 3, near the bead 4 for the casing. Each portion of the tire is composed of layers of fabric material indicated at 5 and 6, respectively, and layers 7 and 8 respectively of rubber for taking the wear.

The improved tire is completed at a single operation, the entire casing being constructed at one time in one process. The improved tire is blow-out proof, for in case of puncture of the outer portion, the inner portion will immediately reinforce the outer portion.

The rubber layer of the inner portion reduces friction between the portions, and it will be understood that the inner tube is used within the casing.

I claim:—

A pneumatic tire casing consisting of inner and outer portions connected at their side edges and separated intermediate their side edges, each of said portions consisting of a layer of fabric material, and a layer of rubber, the layers of fabric material being inward, so that the rubber layer of the inner portion will contact with the fabric layer of the outer portion when the tire is deformed by pressure in use.

CHARLES WILLIAM MIEGEL.